May 1, 1956     A. F. WALTERS     2,743,942

VEHICLE PASSENGER SAFETY GUARD

Filed Feb. 27, 1953

INVENTOR.
ALBERT F. WALTERS
BY
Marvin B. Davis

United States Patent Office 2,743,942
Patented May 1, 1956

2,743,942

VEHICLE PASSENGER SAFETY GUARD

Albert F. Walters, Kansas City, Mo.

Application February 27, 1953, Serial No. 339,439

2 Claims. (Cl. 280—150)

This invention relates to an improvement in a safety guard to protect passengers in motor cars, other vehicles and airplanes.

Heretofore a variety of safety guards have been illustrated with latch type adjustments to adjust the safety guard member between the passenger and the fire wall of the vehicle. Latch type adjustments including pins and clamps as heretofore illustrated will hold the guard in a fixed position when properly latched but each of these devices is subject to failure due to careless handing or tampering by children and others.

An object of the present improved safety guard is to provide a positive screw adjustment that cannot fail to hold the safety guard member in its preadjusted position when the unexpected accident occurs as long as the fire wall of the vehicle remains in its normally spaced relative position from the passenger. This one important object may mean the difference between an uninjured passenger and one maimed for life.

Another object of the present improved safety guard is to provide an automatic means of adjustment of the safety panel through a remote three way switch which can be manually controlled to energize an electric motor through an electric circuit, the switch having a neutral, on, and reverse position.

Another object of the present improved safety guard is to provide a cushioned safety member with a plate member on one side thereof, a pair of spaced parallel telescoping members having one end of each connected to the plate member and having the opposite ends thereof connected to a mounting plate member for the attachment to a fire wall or dash of a vehicle, telescoping screw adjustment members connecting to the panel plate member and the mounting plate member and means to turn the telecoping screw adjustment members to adjust the space between the plate member and the mounting plate member. This means may be accomplished by a hand wheel, or by an electric motor with a gear reduction, connected thereto.

With these objects in view the invention will be more fully understood from the accompanying drawing, the following specification and the appended claims.

Figure 1:
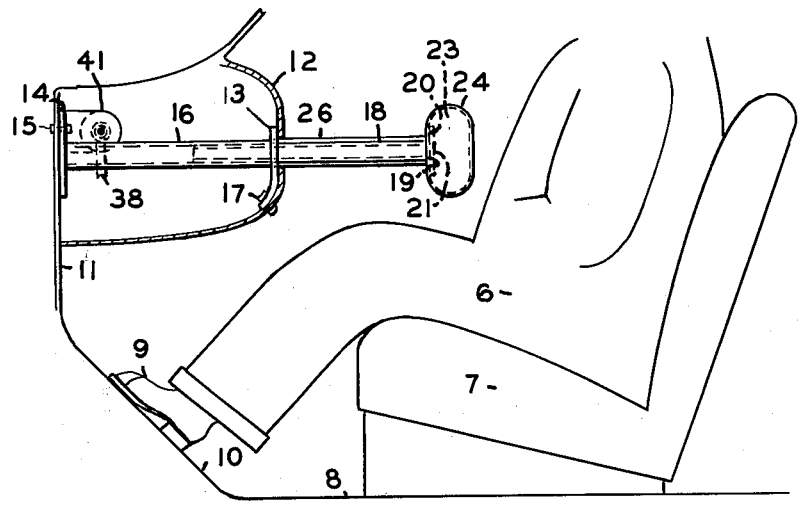
Figure 1 is a fragmentary view in elevation illustrating an outline of a passenger positioned on a motor car seat with his feet resting on the floor of the motor car and the improved safety guard adjusted between the passenger and the fire wall of a vehicle or airplane.

In Figure 1 a passenger 6 rests on the seat 7 mounted on the floor 8 of a motor car and the passenger's feet 9 rest against the inclined floor 10 which is a natural position for the passenger in motor cars of current construction.

The fire wall 11 is provided with the usual dash panel 12 which is preferably a support for a central mounting plate 13. A base mounting plate 14 is bolted to the fire wall 11 by bolts 15 and a pair of tubular members 16 space the central mounting plate 13 from the base mounting plate 14, the central mounting plate 13 being positioned just inside of the dash panel 12 and bolted thereto by bolts 17. The tubular members 16 preferably pass through central mounting plate 13.

A pair of telescoping tubular members 18 are mounted to preferably slide into tubular members 16 with the outer ends 19 of tubular members 18 preferably welded to a guard plate member 20.

The guard plate member 20 is secured to a preferably wood plate member 21 by screws 22 and has a cushion member 23 covered with a sheet member 24 stretched thereover and connected to the wood plate member 21 preferably with tacks or other means 25.

Figure 2:
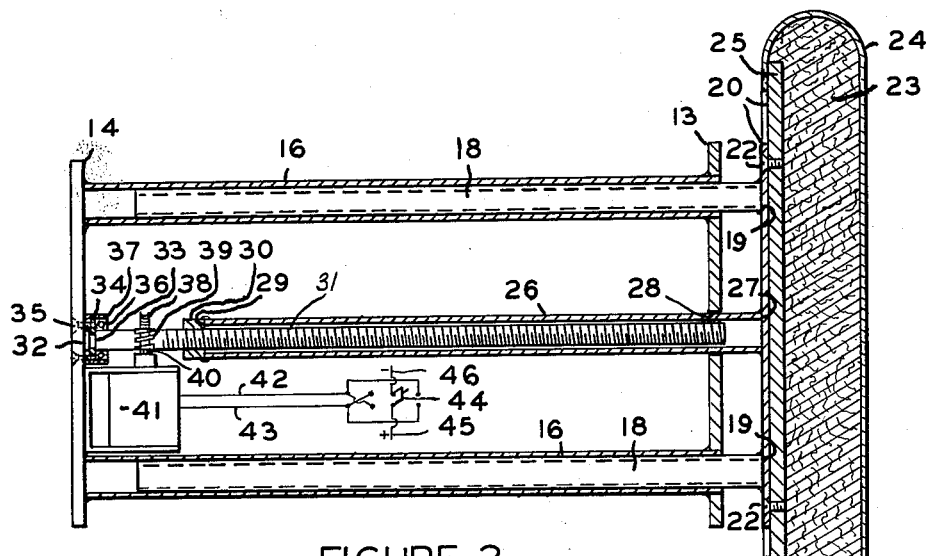
Figure 2 is an enlarged fragmentary view looking downward on, and inside, of parts of the safety guard including a diagrammatic electrical circuit with a manually operatable three way control switch.

In the automatic adjustment of the safety guard member as illustrated in Figures 1 and 2 a tubular member 26 is preferably centrally spaced parallel between tubular members 16 and has the end 27 preferably welded to panel plate 20. This tubular member 26 slides through an opening 28 in the central mounting plate 13 and has the end 29 thereof provided with an internally threaded nut or member 30. A screw member 31 engages the nut or internally threaded member 30 and extends into the tube 26, and the end 32 of the screw member 31 butts against the base mounting plate 14, is provided with annular groove 33 for the reception of retainer plates 34 which are secured to the base mounting plate 14 by screws 35.

An anti-friction bearing 36 receives the screw member 31 next to the annular groove 33 and is mounted on the base mounting plate 14 by the annular retaining member 37.

A worm gear 38 is torque mounted on the screw member 31 and is operated by worm 39 torque mounted or forward on a shaft 40 of a motor-speed reducing member 41 which is remotely controlled by the electric circuit members 42, 43, three way switch member 44, positive electrical connection 45 and negative electrical connection 46. The three way switch may be remotely mounted in any convenient position of the motor car and have push button control for the passenger to operate at will.

Figure 3:
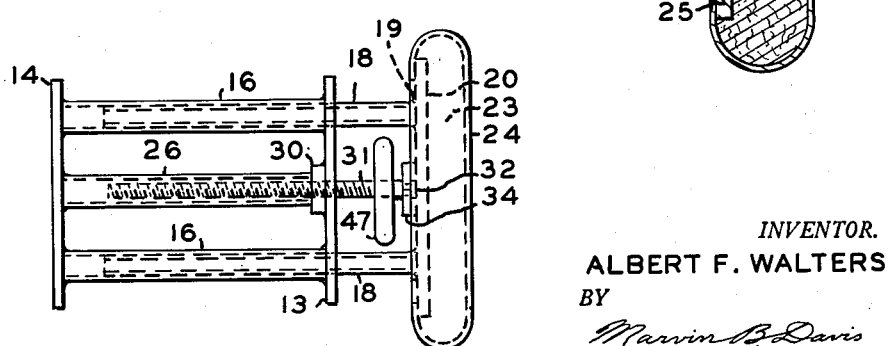
Figure 3 is a plan view of the manually operated safety guard equipped with a hand wheel for turning the adjustment screw to positively adjust the space between the guard plate member and the mounting plate member.

The manually operated safety guard as illustrated in Figure 3 differs from the previously described construction in that the screw member 31 and tubular member 26 are reversed end for end between the base mounting plate 14 and guard mounting plate 20 and the manually operated wheel 47 is torque mounted on the screw 31 in place of the worm gear 38, the hand wheel 47 taking the place of the motor-speed reducer 41, worm gear 38, and the electrical controls to the motor.

The screw member 31 is preferably made with a square type single thread or acme thread for self locking in any adjusted position.

It is obvious that when my improved safety guard is mounted in a vehicle or airplane as preferably illustrated in Figure 1 the safety guard panel cushion member 23 is selectively spaced in front of the person seated on the seat of the vehicle. The telescoping members 18 are slidable in tubular members 16 and the spacing of the cushion member 23 is positively controlled by means of rotating the threaded screw 31 engaging the nut or threaded member 30 secured to the tubular member 26. When the screw is turned the cushion member 23 is moved toward or away from the person depending on the direction the screw member 31 is turned. The screw may be turned with a manually operated hand wheel or the automatic motor-reducer driving means depending on the desire and means of the owner or agent of the motor car.

When the cushion is adjusted to a desired position by means of the screw member 31 it is positively held there and the position of the cushion cannot change without revolving the screw member 31. There are no latches to be partly engaged through the tampering of children or careless operation.

What I claim as new and desire to secure by Letters Patent is:

1. A safety guard having its base mounting plate mounted on the fire wall of a vehicle and extended toward a passenger seated in the vehicle to space him from the windshield of the vehicle when the vehicle is suddenly stopped comprising, a base mounting plate, a central mounting plate, said central mounting plate engaging the dash panel of the vehicle, a pair of tubular members, said pair of tubular members being spaced parallel, one end of each tubular member being connected to said base mounting plate, the opposite end of each tubular member being connected through said central mounting plate, a pair of telescoping tubular members, said pair of telescoping tubular members being slidable in said pair of tubular members, one end of each telescoping tubular member being extended from said pair of tubular members and said central mounting plate, a guard plate member, said guard plate member being connected to the extended ends of said telescoping tubular members, a cushion, said cushion being secured to said guard plate member, a centrally spaced tubular member, said centrally spaced tubular member being centrally spaced between said pair of telescoping tubular members, an internally threaded member, a screw member, one end of said centrally spaced tubular member being secured to said guard plate member, the opposite end of said centrally spaced tubular member being secured to said internally threaded member, said screw member engaging said internally threaded member, said screw member telescoping said centrally spaced tubular member, one end of said screw member projecting from said internally threaded member, the projected end of said screw member being pivotally connected with said mounting plate, an actuator, and said actuator rotatively engaging said screw.

2. A safety guard having its base mounting plate mounted on the fire wall of a vehicle and extended toward a passenger seated in the vehicle to space him from the windshield of the vehicle when the vehicle is suddenly stopped comprising, a base mounting plate, a central mounting plate, said central mounting plate engaging the dash panel of the vehicle, a pair of tubular members, said pair of tubular members being spaced parallel, one end of each tubular member being connected to said base mounting plate, the opposite end of each tubular member being connected through said central mounting plate, a pair of telescoping tubular members, said pair of telescoping tubular members being slidable in said pair of tubular members, one end of each telescoping tubular member being extended from said pair of tubular members and said central mounting plate, a guard plate member, said guard plate member being connected to the extended ends of said telescoping tubular members, a cushion, said cushion being secured to said guard plate member, a centrally spaced tubular member, said centrally spaced tubular member being centrally spaced between said pair of telescoping tubular members, an internally threaded member, a screw member, one end of said centrally spaced tubular member being secured to said guard plate member, the opposite end of said centrally spaced tubular member being secured to said internally threaded member, said screw member engaging said internally threaded member, said screw member telescoping said centrally spaced tubular member, one end of said screw member projecting from said internally threaded member, the projected end of said screw member being pivotally connected with said mounting plate, means, and said means for rotatively engaging said screw.

References Cited in the file of this patent
UNITED STATES PATENTS

| | | |
|---|---|---|
| 912,505 | Stockwell | Feb. 16, 1909 |
| 929,998 | Taylor | Aug. 3, 1909 |
| 1,397,882 | Schwerin | Nov. 22, 1921 |
| 1,548,870 | Crafton | Aug. 11, 1925 |
| 1,619,697 | Brown | Mar. 1, 1927 |
| 2,034,624 | Lamb | Mar. 17, 1936 |
| 2,322,755 | Voorhies | June 29, 1943 |
| 2,499,993 | Gregg | Mar. 7, 1950 |
| 2,650,835 | Gonsett | Sept. 1, 1953 |